United States Patent Office

3,694,249
Patented Sept. 26, 1972

3,694,249
PLATABLE POLYPROPYLENE
Ismat A. Abu-Isa, Birmingham, Mich., assignor to General Motors Corporation, Detroit, Mich.
No Drawing. Filed Dec. 23, 1970, Ser. No. 101,093
Int. Cl. B44d 1/092
U.S. Cl. 117—47 A  3 Claims

ABSTRACT OF THE DISCLOSURE

A process for plating polypropylene which includes uniformly blending a small proportion of an ethylene-propylene terpolymer, such as EPDM, with the polypropylene, forming an article with the blend, and extensively etching the article surface with a strong oxidizing agent as a surface preparation for plating. Very adherent deposits are obtained without pre-etching.

---

This invention relates to the metal plating of polypropylene compositions. Molded polypropylene articles are difficult to satisfactorily plate. Surface wettability and metal adhesion have been a problem. Etching of the polypropylene prior to plating can, of course, improve surface wettability and metal adhesion. However, commercial grades of polypropylene initially available could not be etched uniformly. An extra initial surface preparation, or pre-etch, was needed. It involved soaking the polymer in an organic swelling agent, such as turpentine or the like, before etching. More recently, polypropylene compositions have become available which do not require an organic pre-etch treatment. These later compositions contain additives which promote uniform etching of the polypropylene composition. This, in turn, enhances the ability of the polypropylene to accept a uniform electroless deposit of metal. While addition agents improve platability, they may or may not provide significant improvements in metal adhesion. In addition, the addition agent can produce a significant loss in some of the more desirable physical properties of the polypropylene, notably impact strength and heat deflection resistance.

Accordingly, it is an object of this invention to provide a novel polypropylene blend and process of treating it that not only does not require a pre-etch for platability but also offers a significant improvement in metal adhesion, without reduction in impact strength or heat deflection resistance. Other objects of this invention will become more apparent from the detailed description which follows.

In accordance with this invention about 2%–20% of an ethylene-propylene terpolymer is intimately blended with the polypropylene. The polypropylene is extensively etched with a very strong oxidant to prepare it for plating.

The ethylene-propylene terpolymer is a rubbery polymer of ethylene, propylene, and a copolymerizable diolefinic material such as a nonconjugated diene. Synthetic elastomers such as this are identified as EPDM rubbers in the ASTM designation D1418–56T. Processes for making EPDM rubbers are disclosed in United States Patents Nos. 2,933,480 and 3,000,866. As used herein, the term "polypropylene" is intended to include both the polypropylene homopolymers and the principal copolymers thereof, such as the ethylene-propylene copolymers.

The EPDM must be intimately blended with the polypropylene to achieve the benefits of this invention. One cannot simply mix polypropylene and EPDM granules, mold the mixture and expect to get the benefits of this invention. Intimate blending of the two, as by working on a hot rubber mill, is necessary to realize these benefits. The mixture should be milled until one obtains a uniform blend. The mixing time needed to attain such a product will vary, of course, depending on the mill size, mixture volume, temperature, etc. Mill temperatures of about 300° F.–370° F. can be used and I prefer to use a mill temperature of about 330° F. At significantly lower temperatures the polypropylene is too stiff to mill and at higher temperatures it is too sticky to work with.

At least about 2%, by weight, EPDM is needed as an additive to the polypropylene to notice any significant improvement in platability or adhesion without a pre-etch. Even then, longer etch times seem desirable. On the other hand, proportions in excess of about 15%, by weight, become increasingly more difficult to uniformly blend. Proportions greater than 20% by weight may tend to reduce impact strength and heat deflection resistance, without producing any significant gain in metal adhesion. For most applications I prefer to use a polypropylene blend containing about 5%–10% by weight EPDM. Such mixtures even have greater impact strength than the base material itself.

It appears that the EPDM in some way coacts with the polypropylene to permit etching of polypropylene itself, not just the EPDM. This etching seems to promote a molecular bonding, of the subsequently applied metal, not just a physical keying effect. In any event, the adhesion realized is far greater than that which one gets by incorporating some other dispersed phase with the polypropylene. Additives and fillers normally incorporated in the polypropylene base material do not seem to interfere with this peculiar coaction. In prior art blends of plastics, it is conventional to incorporate a dispersed phase that can subsequently be etched out to promote wettability and enhance adhesion by physical keying effects. However, just simply etching out the EPDM with an acid does not provide the significant improvement this invention affords.

The polypropylene-EPDM blend must be extensively etched with a strong oxidizing agent. For example, concentrated sulfuric acid with not etch adequately within a normal treatment time, even if minor amounts of chromic acid, $CrO_3$, are included. A hot, stronger oxidant is needed, such as highly concentrated solutions of $CrO_3$, in water or concentrated sulfuric acid. Even with substantially saturated aqueous solutions of $CrO_3$, an etch time of 15–20 minutes is needed at 75° C. to attain the extensive etch. On the other hand etch times significantly in excess of 20 minutes tend to degrade the surface and adhesion values decline. Higher temperature etching, up to 90° C. reduces etch time, down to four minutes in some instances. Generally, I prefer an etch time of about 10–15 minutes. Chromic acid solutions must be at least 50%, and preferably 65%, by weight $CrO_3$, if one is to attain the needed etch within the described times. Generally, substantially saturated aqueous $CrO_3$ solutions, e.g. about 900 grams per liter, produce suitable etching in about 10–15 minutes at about 80° C.–90° C.

Polypropylene mixtures prepared in accordance with this invention must be initially strongly etched, as previously described. Otherwise, they are platable using any of the conventional polymer plating processes known to those skilled in the art. Conventional processes usually involve etching the surface with a strong oxidizing agent. Here it is necessary that the etch with the oxidizing agent be extensive. Afterwards, the surface is sensitized with an aqueous $SnCl_2$ solution, activated with a $PdCl_2$ solution and then a metal (e.g., Ni) electrolessly deposited, followed by any desired electroplating sequence. Likewise, polypropylenes prepared in accordance with this invention can be satisfactorily plated utilizing the commercially available MaCuplex system marketed by MacDermid, Inc. That process is a variation of that described above and involves the use of a mixture of stannous chloride and colloidal palladium instead of the more conventional sensitizing solution. This step is followed by a palladium chloride accelerator treatment. Likewise, the polypropylenes of this invention may be used in systems employing organic swelling pre-etch treatments, though as indicated before, such treatments are not necessary.

Serving as a specific example of this invention is a mixture of 25 grams EPDM, such as Du Pont's Nordel 1070, and 475 grams of a polypropylene homopolymer, such as Hercules' Profax 6523. The mixture is uniformly blended on a rubber mill having three inch diameter or five inch diameter rolls, maintained at a temperature of about 330° F. Hot milling produces a high degree of uniformity in the blend and insures best results. The preferred milling temperature can be adjusted to each mixture being blended. However, temperatures of about 300 F.–400° F. are generally useful. The described mixture is milled for about 15 minutes and allowed to cool. The resultant blend will then have uniform physical properties, and exhibit a uniformly etched surface after the subsequently described chromic acid treatment.

The blend is then ground into appropriate particle size and molded into an article of the desired shape, as for example a 6 inch tensile test bar. The molded article is immersed in an aqueous chromic acid etching solution containing 900 grams per liter of $CrO_3$ at 80° C. for 15 minutes. After rinsing, the pieces are treated for 3 minutes in a room temperature, acidic, aqueous stannous chloride solution containing about 35 grams per liter of $SnCl_2$, and 30 milliliters per liter of HCl to sensitize its surface. After rinsing, the pieces are next activated for 3 minutes, in a 75° F. aqueous palladium chloride solution containing 0.26 gram per liter palladium chloride and 4.5 milliliters per liter HCl. After rinsing, nickel is electrolessly deposited onto the surface for 7 minutes from an aqueous, 75° C. solution containing about 36 grams per liter nickel sulfate heptahydrate, 3.6 grams per liter sodium hydroxide, 28 grams per liter sodium hypophosphite, 13 cc. per liter acetic acid and 10 drops of lead concentrate (1 g./l. $Pb^{++}$). The pieces are rinsed and next electroplated in any of the usual ways. For example, one can finish the plating by subsequently applying successive deposits of copper, nickel and chrome in any of the known and accepted manners.

While this invention has been described in terms of specific embodiments thereof it is not intended that it be limited thereto except to the extent hereinafter set forth in the appended claims which follow.

I claim:
1. The process of adherently metal plating a polypropylene-based article which comprises the steps of hot milling a polypropylene mixture containing about 5%–10%, by weight, EPDM rubber to form a uniform blend, molding the blend into an article of desired shape, extensively etching a surface of said article at a temperature of at least about 75° C. with a strong oxidizing solution containing at least about 65%, by weight, chromic acid, depositing a catalytic metal on said surface to provide nucleation sites for subsequently applied electroless metal deposits, and electrolessly depositing a metal on said surface to form a continuous adherent layer thereon.

2. The process of making adherent metal deposits on polypropylene-base articles which comprises the steps of forming a mixture containing polypropylene and 2%–15%, by weight, EPDM rubber, milling said polypropylene mixture at a temperature of about 300° F.–370° F. until said EPDM rubber is uniformly blended with the polypropylene, molding an article with the blended mixture, extensively etching a surface of said molded article for about 4–20 minutes at a temperature of at least about 75° C. with an aqueous solution substantially saturated with $CrO_3$, depositing a catalytic metal on said surface to provide nucleation sites for subsequently applied electroless metal deposits, and electrolessly depositing a metal on said surface to form a continuous adherent layer thereon.

3. The process of adherently metal plating a polypropylene-based article which comprises the steps of hot milling a polypropylene mixture containing about 2%–20%, by weight, EPDM rubber to form a uniform blend, molding the blend into an article of desired shape, extensively etching a surface of said article at a temperature of at least about 75° C. with a strong oxidizing solution containing at least about 65%, by weight, chromic acid, depositing a catalytic metal on said surface to provide nucleation sites for subsequently applied electroless metal deposits, and electrolessly depositing a metal on said surface to form a continuous adherent layer thereon.

References Cited
UNITED STATES PATENTS

| | | | |
|---|---|---|---|
| 3,556,955 | 1/1971 | Ancker et al. | 117—138.8 X |
| 3,372,049 | 3/1968 | Schaffhausen | 117—138.8 X |
| 3,560,257 | 2/1971 | Schneble, Jr. et al. | 117—213 X |
| 3,501,332 | 3/1970 | Buckman | 117—138.8 X |

MURRAY KATZ, Primary Examiner

S. L. CHILDS, Assistant Examiner

U.S. Cl. X.R.

117—138.8 E